United States Patent [19]

Crowley

[11] 3,817,479

[45] June 18, 1974

[54] HELICOPTER POWERED AIR CUSHIONED PLATFORM

[76] Inventor: Walter A. Crowley, Rt. 1, Box 535L, Oak Harbor, Wash. 98277

[22] Filed: Oct. 2, 1972

[21] Appl. No.: 294,369

[52] U.S. Cl.................. 244/17.11, 180/116, 244/2
[51] Int. Cl. .......................................... B64c 27/00
[58] Field of Search........ 244/2, 17.11, 17.17, 12 R; 180/116–130

[56] References Cited
UNITED STATES PATENTS

| | | | |
|---|---|---|---|
| 3,070,326 | 12/1962 | Griffith | 244/2 |
| 3,175,785 | 3/1965 | De Tore et al. | 244/17.11 |
| 3,177,959 | 4/1965 | Gaska | 180/120 |
| 3,193,215 | 7/1965 | Dunham | 180/122 X |
| 3,285,535 | 11/1966 | Crowley | 244/2 |
| 3,291,242 | 12/1966 | Tinajero | 180/116 |

Primary Examiner—Milton Buchler
Assistant Examiner—Paul E. Sauberer

[57] ABSTRACT

A helicopter powered air cushioned platform having a substantially planar upper surface for supporting cargo or the like. A standard commercial helicopter is secured centrally of the platform upon a supporting pad which may selectively be elevated or tilted to provide forward thrust. A segmented air intake duct is hingedly secured to the deck whereby the angle of each of the segments may be selectively controlled, thus accommodating helicopters of varying configuratins and further allowing rotor clearance when the helicopter supporting pad is tilted and thus provides forward thrust. The adjacent segments of the air intake duct are joined by an impervious flexible means whereby the duct is substantially airtight whether in the elevated or the collapsed position. The underside of the deck structure includes an extendible support member whereby the platform will be structurally stable when not supported by a cushion or air, as will be the case when loading or unloading the deck.

5 Claims, 8 Drawing Figures

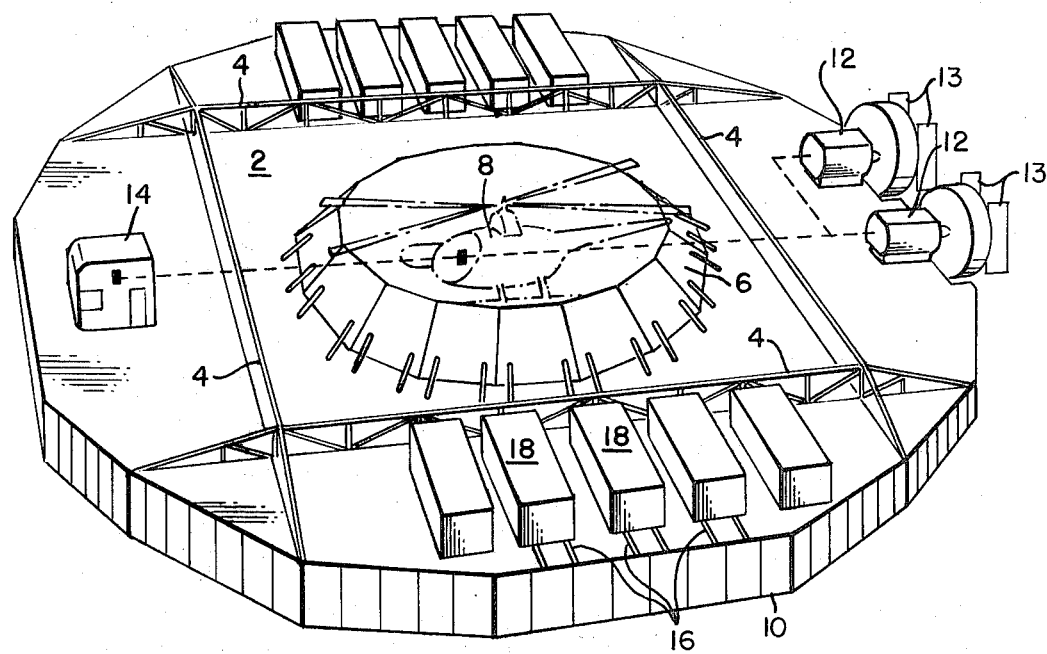
FIG. 1
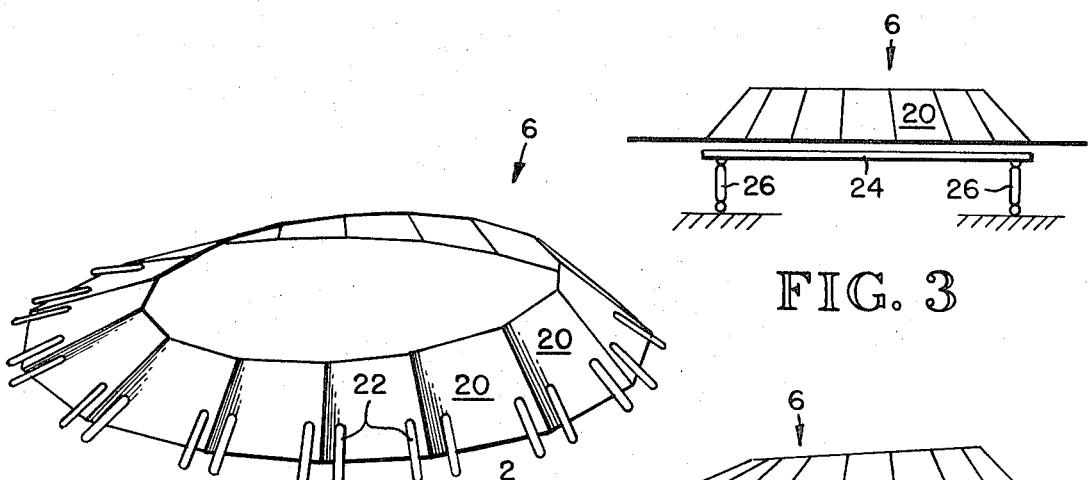
FIG. 2
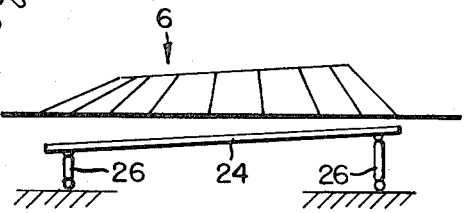
FIG. 3
FIG. 4

HELICOPTER POWERED AIR CUSHIONED PLATFORM

BACKGROUND OF THE INVENTION

The present invention relates generally to an improved ground effect machine in which an air cushioned platform is associated with a mobile source of pressurized gas and particularly with a helicopter or other vertical takeoff aircraft in such a manner that the downwash from the aircraft is utilized to create the lifting pressure against the platform. A ground effect machine of the general type hereinabove described is fully disclosed in U.S. Pat. No. 3,285,535 granted Nov. 15, 1966, to the present inventor. As illustrated and described in the above noted patent, the ground effect machine included a central located pad or platform upon which a helicopter is secured. Mounted to the cargo supporting deck surrounding the platform is a diffuser or air duct configuration which channels the downwash of the rotor through an open grating to a plenum beneath the deck. The deck includes a peripheral, downwardly depending skirt to contain the air beneath the deck providing the lift necessary for transporting the platform and attached cargo. The forward thrust for the ground effect machine can be provided by auxiliary thrust engines mounted upon the deck or alternatively by controlling the pitch of the rotor of the helicopter.

Although the ground effect machine as described in the above noted patent has proven to be a very feasible and economical transport for lightering or the like, there have been seen some portions upon which improvement could well be made. One of the problems with the ground effect machine as shown in the above entitled patent has been a complex louver system which was located beneath the helicopter supporting pad. The pad must necessarily be of a gridwork type to allow the downwash of the helicopter rotor to pass through the platform and into the plenum. When the helicopter is taking off or landing the downwash tends to lift the platform in an uncontrolled manner since the helicopter is not secured to the pad. If the platform is not secured to its supporting surface, a condition which is impossible when using the platform for lightering an anchored vessel, the louver or baffles are necessary to selectively block the downwash and prevent it from entering the plenum.

Another area which has proven to be somewhat of a problem has been in the diffuser or ductwork which extends above the cargo supporting deck to channel the downwash to the plenum. This item has obscured the vision of the pilot either when landing, taking off or when moving the laden platform. Further, the diffuser or ductwork because of its position presented a danger of damage to the helicopter or the rotors of the helicopter during takeoff or landing, since the diffuser or ductwork extends up close to the rotor in order to capitalize upon the entire downwash.

Still another area which has proven to be incovenient is in the fact that the skirt of the ground effect vehicle, as described in the above-entitled patent, was rigid to support the ground effect machine when the machine was resting and has proven very satisfactory from this standpoint. However, when the machine was used over something other than relatively smooth terrain an upwardly projecting object had to either be circumvented or it would cause damage to the rigid skirt. The rigid skirt likewise prevented the ground effect machine from passing over small knobby hills or any other rapid change in the terrain. An upward or downward irregularity would cause the clearance between the skirt bottom and the supporting surface to be lessened thus endangering any rigid depending portion.

With the above noted disadvantages in mind, it is an object of the present invention to provide an air cushion supported cargo carrying vehicle wherein the depending skirt, which partially defines the plenum, is formed of a flexible multi-sectioned material whereby the vehicle may pass over uneven ground without damage to the skirt since it readily conforms to an irregularity.

It is another object of the present invention to provide a cargo carrying air cushioned vehicle wherein the air under pressure for supporting the vehicle is provided by the downwash of a helicopter rotor which is supported upon a landing pad centrally of the vehicle. The helicopter supporting landing pad is adjustable both as to height and as to angular position relative to the planar upper surface of the vehicle whereby the most efficient placement of the helicopter may be quickly and easily accomplished.

Still another object of the present invention is to provide a shroud or air duct surrounding the landing pad for the helicopter whereby the downwash of the helicopter rotor may be channeled into the plenum beneath the platform. The shroud or air duct is fabricated of a plurality of sections whereby it may be given an unsymmetric configuration to capitalize upon the air flow and overall configuration of the body.

Still another object of the present invention is to provide a sectioned shroud or air duct for surrounding the helicopter for guiding the downdraft of the rotor into the plenum wherein the sections of the shroud are interlinked by flexible gas impervious elements and are hingedly connected to the deck whereby they prevent flow of the downwash when collapsed onto the deck and channel and downwash when extending upwardly.

Still another object of the present invention is to provide an air cushioned supporting platform incorporating, beneath the platform, a plurality of retractable load supporting elements whereby when the platform is on the ground or not supported by the air cushion, a load supporting element will be beneath each of the positions of greatest stress decreasing the flexing of the platform during loading and unloading operations and increasing the overall stability.

Still another object of the present invention is to provide an air cushioned platform whereby the helicopter which provides the downdraft may be completely controlled from a control tower located upon the platform distant from the helicopter. The control tower would be linked to the helicopter and would provide not only the controls for the helicopter rotor but also controls for the thrust engines and any or all other functions of the vehicle.

BRIEF DESCRIPTION OF THE DRAWINGS

FIG. 1 is an environmental view showing the preferred embodiment of the air cushion vehicle and the relative location of the main structural elements.

FIG. 2 is an enlarged view of the air diffuser or duct system which surrounds the helicopter when the helicopter is in use transporting the platform.

FIG. 3 is a schematic representation of the helicopter supporting pad and the duct system when they are in a position for vertical liftoff, landing or the like.

FIG. 4 is a schematic view similar to FIG. 3 with the helicopter landing pad in a tilted position and the diffusers appropriately shaped to accommodate the tilt.

DETAILED DESCRIPTION OF THE DRAWINGS

Figure 5:
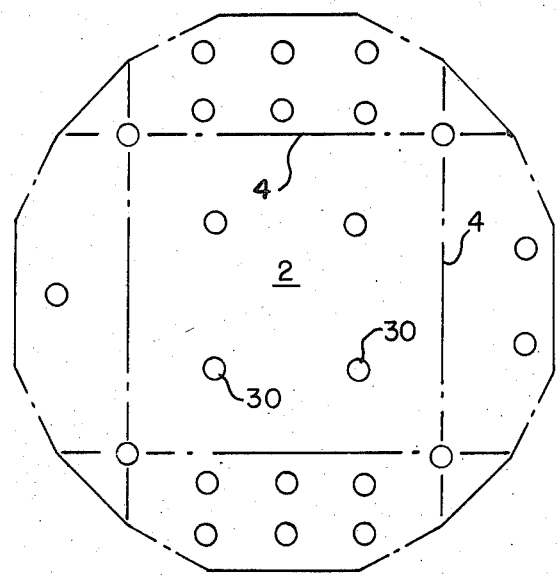
FIG. 5 is a schematic plan view showing the preferred location of retractable support means for use when the air cushion vehicle is resting upon firm ground, thus relieving the skirts or other depending elements of the possibility of damage.

As can be seen in FIG. 1, the preferred embodiment of the air cushioned vehicle comprises a generally flat deck 2 which may be of any air worthy configuration, although circular or close to circular has been found to be the most economical. The upper portion of the deck is reinforced by transverse girders 4 which add stability to the deck as well as providing the necessary strength when the vehicle is not supported by a cushion of air.

Located approximately centrally of the deck is a pod containing the helicopter supporting platform, not shown, surrounded by a segmented air diffuser or shroud 6 which channels the downdraft from helicopter 8 to the plenum area formed by the bottom portion of deck 2, peripheral skirt 10 and the supporting surface. Located at the aft portion of the deck are a pair of auxiliary thrust motors 12 which increase the possible speed of the platform as well as providing a directional stability by air passing the rudder elements 13. Located at the forward end of the platform is a control station 14 which, as described hereinafter, will be capable of controlling all of the functions during flight or landing of the air cushion platform. Mounted upon opposite sides of the air cushion platform are a plurality of rails 16 which may be used for moving cargo 18 on and off the platform itself. It is to be understood that the rails are for stiffening the deck for cargo support, cargo tiedown and may be used for moving the cargo to and from the proper position on the deck.

As can be best seen in FIG. 2, the shroud or wind diffuser, generally designated as 6, comprises a plurality of individual sections or panels 20 which are hingedly secured to the deck 2. Each section, within certain limits, is capable of being positionally controlled by hydraulic or pneumatic pistons 22. Sections 20 are hinged and controlled as to height so that when the helicopter is taking off or landing the pilot has clear vision of the surrounding deck. During takeoff and landing the sections are lowered to a relatively horizontal position, clearing all obstructions for the pilot. Otherwise, during takeoff and landing of the helicopter the downwash from the propeller would have a tendency to build up air within the plenum chamber, lifting the platform, an undesirable result. By collapsing the sections 20 down against the landing pad the amount of open area wherein the downdraft could pass is lessened. The remainder of the open area which would normally be beneath the helicopter is then closed by louvers or the like as described in the hereinabove noted patent. Once the helicopter is down and secured to its landing pad, the sections 20 are lifted to provide a duct or diffuser system which is positioned to capitalize upon the maximum amount of downdraft, thereby providing the maximum amount of pressure or lift within the plenum chamber.

As is well known, the helicopter when flying as a separate unit uses its relative position to provide forward motion, i.e. the copter may be slightly tipped thus causing the thrust of the propellers to cause forward motion the same time it is providing lift for keeping the helicopter in the air. Capitalizing upon this known factor, the helicopter landing pad 24 as seen in FIGS. 3 and 4, is mounted upon pistons 26 which are secured to a relatively stable portion of the platform and will raise and lower the pad as well as providing the slight tilt thereto. Raising the pad 24 during takeoff or landing of the helicopter further increases the visibility of the pilot. Lowering the platform tends to channel more downwash into the plenum chamber. As seen in FIG. 3 the landing platform 24 is in a relatively horizontal position and the shroud or duct system 6 has each of the sections 20 located about 45° to the horizontal.

The configuration of pad 24, as shown in FIG. 3, is the most efficient condition for takeoffs and landing since the helicopter itself will provide no sideward thrust. When in motion, however, by tilting the pad 24 as shown in FIG. 4, the helicopter will provide forward thrust.

By changing the configuration of the shroud or ductwork 6, as illustrated in FIG. 4, the aft portion of the shroud may serve as a scoop drawing air from the upper atmosphere and forcing it down into the plenum. As can be readily seen when the platform is moving in the direction of the arrow most of the air which is passing over the top of ductwork 6 will be channeled downwardly by the upwardly extending aft portion of the shroud or ductwork.

Figure 6:
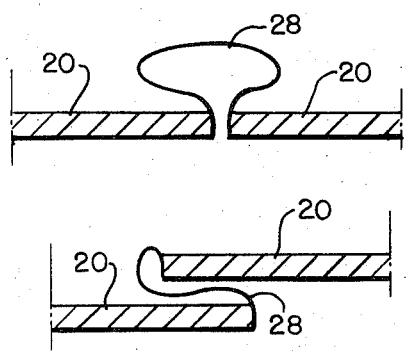
FIG. 6 is a sectional view through the abutting edges of the diffuser or duct system surrounding the helicopter showing the means for assuring relative air tightness.

Referring now to FIG. 6 it can be seen that the adjacent sections or panels of the shroud or ductwork 6 are joined by means of a fabric 28 such that the area is closed to passage of air when in an upwardly extending position as shown in the upper portion of FIG. 6 or alternatively it will provide a closed surface interlocking overlapping panels when the ductwork is laid against the deck before landing or takeoff of the helicopter (as shown in the lower portion of FIG. 6).

Figure 7:
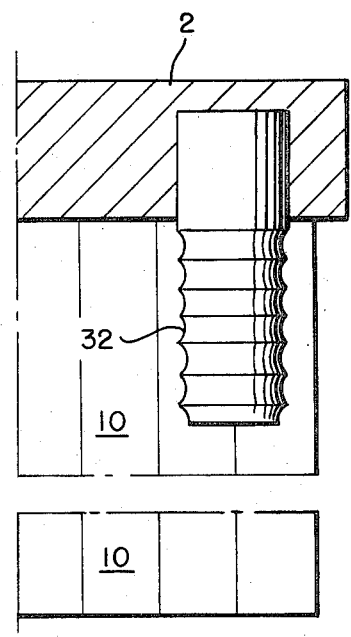
FIG. 7 is a schematic sectional view of one possible means of supporting the platform when resting upon firm ground.

Referring now to FIG. 5, which is a general plan view of the platform, it can be seen that the deck 2 which as noted above has rigid girders 4 for stability and strength, is designed to be supported when it is at rest upon a solid surface by a plurality of ground contacting elements 30. Ground contacting elements 30 are located at points of greatest known stress; i.e. at the intersection of the girders 4, beneath the cargo supporting sides, beneath the helicopter supporting pad, beneath the control tower and also beneath thrust engines. While it is desirable that the ground contacting elements be available for use when placing the platform upon solid ground, it is also desirable that they be retracted such that they do not interfere with the air flow during flight. As can be seen in FIG. 7, the preferred embodiment of the ground contacting supports comprise expandable gaseous filled legs 32 which can be filled with a fluid such as air upon landing such that they extend up to one-half way to the bottom of the skirt and yet during flight may be subjected to a vacuum and retracted up such that they are essentially coplanar with the bottom of the deck 2.

Figure 8:
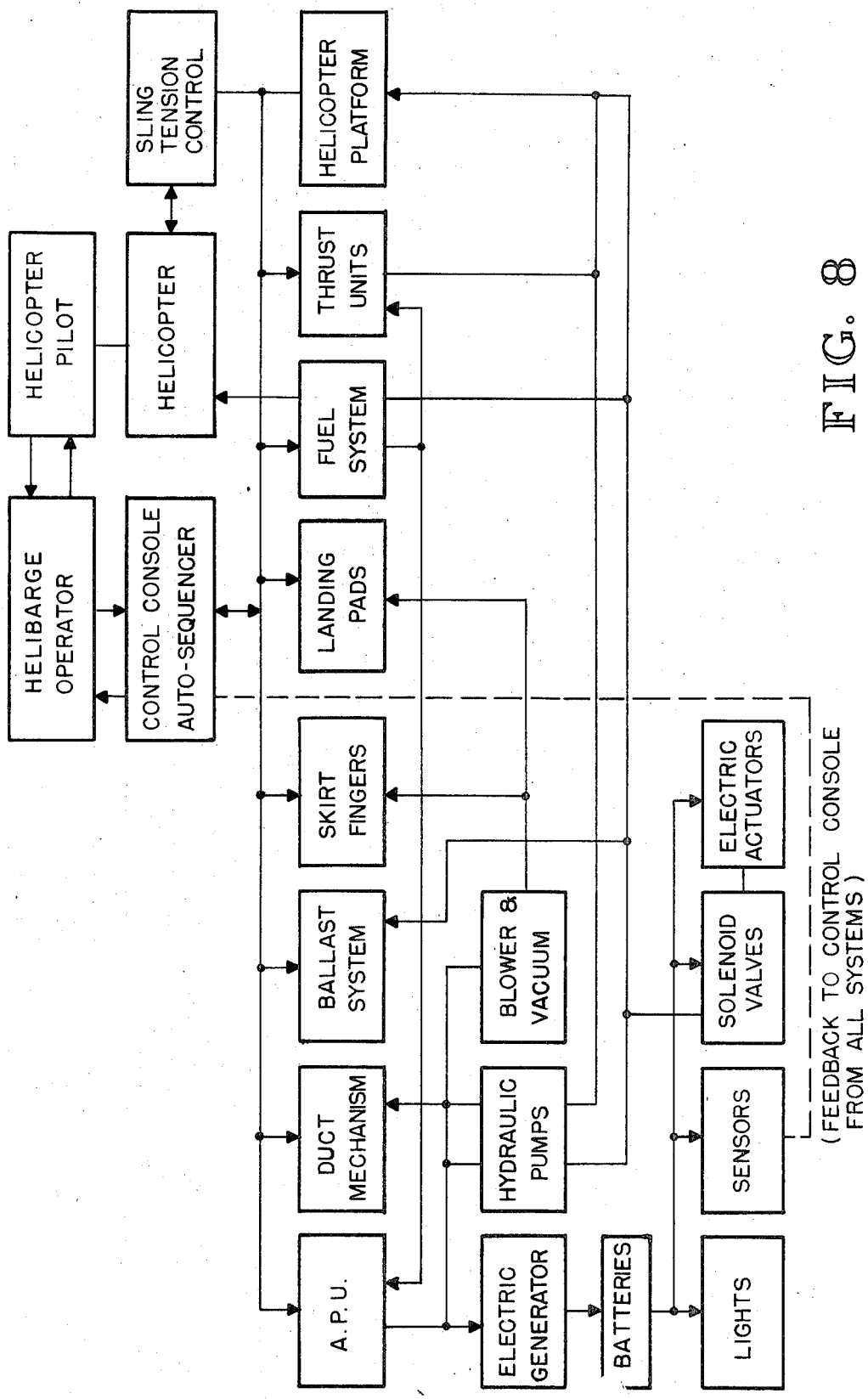
FIG. 8 is a schematic representation of the various control functions which may be incorporated into the air cushion vehicle.

Referring now to FIG. 8 there is shown a somewhat self-explanatory schematic of the control system for the platform. As can be seen in the schematic, the two individuals who are required to operate the vehicle are the helibarge operator and the helicopter pilot. These can be either separate individuals or alternatively could conceivably be one individual if the control console were sufficiently interconnected with the helicopter such that the pilot, once the helicopter were landed upon the platform, could then go to the control console and run the helicopter as well as the other functions that are necessary for operating the platform. Very briefly, it can be seen that the mechanisms which are under the control of the operator at the console are the auxiliary power unit, which provides power for the generator as well as driving the hydraulic pump, blower vacuum and things of this nature. The auxiliary powered unit also drives a generator which assures that the batteries are always in operative condition such that the necessary lights, sensors, solenoid valves, and electric actuators will be operational as well as feedback to the control console which would be an electronic monitor of all the systems. The hydraulic pumps drive the duct mechanism, properly controlling the various sections, the ballast system, moving a liquid to balance any off-center loading, the landing pads, thrust units and the helicopter platform. The blower/vacuum controls the skirt fingers which permits stiffening of the skirt during flight and greater flexibility during landing of the vehicle and further provided a vacuum to the landing pads for retracting them when the vehicle is in flight.

As can be seen, the air cushioned vehicle as hereinabove described utilizes the downwash of a standard helicopter rotor to provide lift for weight far greater than would be normally available to the helicopter. Further, the proper control of the helicopter duct or diffuser, the skirts and the landing pads permit the vehicle to have a maximum amount of ground clearance, a relatively rapid forward space for whatever the operation and further permit complete control of the entire vehicle from a central location.

The embodiments of the invention in which an exclusive property or privilege is claimed are defined as follows:

1. An air cushion vehicle adapted to be supported by air pressure generated by the downdraft of a helicopter rotor or the like, comprising:
   a relatively stable, cargo-supporting surface including a centrally located helicopter-supporting platform having appropriate securement means for attaching the helicopter during use, and
   adjustable means effectively supporting the platform whereby the platform may be selectively moved upwardly or downwardly relative to the cargo-supporting surface and the downdraft of the rotor may be used most efficiently.

2. An air cushion vehicle as in claim 1 wherein the helicopter supporting platform may be selectively placed at an angle to the horizontal permitting the rotors of the helicopter to generate a forward thrust in addition to the vertical lift.

3. An air cushion vehicle adapted to be supported by the downwash of the propeller of a helicopter secured centrally of the vehicle comprising;
   helicopter supporting platform means including means to selectively secure the helicopter during transport of the vehicle
   collapsible diffuser means surrounding the helicopter supporting platform means whereby the diffuser means may be collapsed against the deck while the helicopter is landing upon or leaving the vehicle and raised to a position surrounding the helicopter channeling the downwash of the propeller into the plenum for lifting the vehicle.

4. An air cushion vehicle as in claim 3 wherein the diffuser means comprises a plurality of segments hingedly secured to the vehicle whereby each segment may be selectively moved to a partially elevated position whereby the shape of the diffuser means may be varied to accommodate the helicopter.

5. An air cushion vehicle as in claim 4 wherein flexible means extend between adjacent segments providing substantially air tight diffuser whether in the collapsed or extended position.

* * * * *